(12) United States Patent
Walker et al.

(10) Patent No.: US 9,706,036 B2
(45) Date of Patent: Jul. 11, 2017

(54) MOBILE WIRELESS COMMUNICATIONS DEVICE PROVIDING GUIDE DIRECTION INDICATOR FOR NEAR FIELD COMMUNICATION (NFC) INITIATION AND RELATED METHODS

(75) Inventors: David Ryan Walker, Waterloo (CA); Jerome Pasquero, Kitchener (CA)

(73) Assignee: BLACKBERRY LIMITED, Waterloo (CA)

( * ) Notice: Subject to any disclaimer, the term of this patent is extended or adjusted under 35 U.S.C. 154(b) by 624 days.

(21) Appl. No.: 13/311,013

(22) Filed: Dec. 5, 2011

(65) Prior Publication Data

US 2013/0141567 A1 Jun. 6, 2013

(51) Int. Cl.
*H04N 7/18* (2006.01)
*H04B 5/00* (2006.01)
*H04M 1/725* (2006.01)
*H04W 4/00* (2009.01)
*G01S 5/02* (2010.01)

(52) U.S. Cl.
CPC ............ *H04M 1/7253* (2013.01); *G01S 5/02* (2013.01); *H04B 5/00* (2013.01); *H04W 4/008* (2013.01); *H04M 2250/04* (2013.01)

(58) Field of Classification Search
CPC ...... G01B 11/022; G01B 11/024; H04N 7/18; H04N 7/181; G01C 15/00; H04M 1/7253; H04M 2250/04; G01S 5/02; H04B 5/00; H04W 4/008
USPC .......................................................... 348/135
See application file for complete search history.

(56) References Cited

U.S. PATENT DOCUMENTS

| 7,769,345 | B2 | 8/2010 | Johnson et al. ............. 455/41.1 |
| 7,911,382 | B2 | 3/2011 | Liu et al. ................. 342/357.64 |
| 2005/0077356 | A1* | 4/2005 | Takayama et al. ............ 235/451 |
| 2007/0135112 | A1* | 6/2007 | Lessing ........................ 455/418 |
| 2008/0093447 | A1 | 4/2008 | Johnson et al. |
| 2008/0194298 | A1 | 8/2008 | Panabaker et al. |
| 2009/0287587 | A1 | 11/2009 | Bloebaum et al. |
| 2010/0082490 | A1* | 4/2010 | Rosenblatt et al. ............ 705/64 |
| 2011/0169947 | A1 | 7/2011 | Gum et al. |

* cited by examiner

*Primary Examiner* — Gims Philippe
*Assistant Examiner* — On S Mung
(74) *Attorney, Agent, or Firm* — Guntin & Gust, PLC; Matthew B. Tropper

(57) ABSTRACT

A mobile device may include a display, an optical sensor having a field of view, a movement sensor, a first near-field communication (NFC) device, and a controller. The controller may be configured to display the field of view of the optical sensor on the display, locate a second NFC device within the field of view, and display a direction indicator(s) on the display to indicate a guide direction of movement to align the first NFC device with the second NFC device. When the second NFC device falls outside the field of view, the controller may be configured to display the guide direction indicator(s) on the display to relocate the second NFC device within the field of view based upon the movement sensor. The controller may also be configured to cause the first NFC device to communicate with the second NFC device based upon proximity to the second NFC device.

24 Claims, 6 Drawing Sheets

MOBILE WIRELESS COMMUNICATIONS DEVICE PROVIDING GUIDE DIRECTION INDICATOR FOR NEAR FIELD COMMUNICATION (NFC) INITIATION AND RELATED METHODS

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

DETAILED DESCRIPTION

Figure 1:
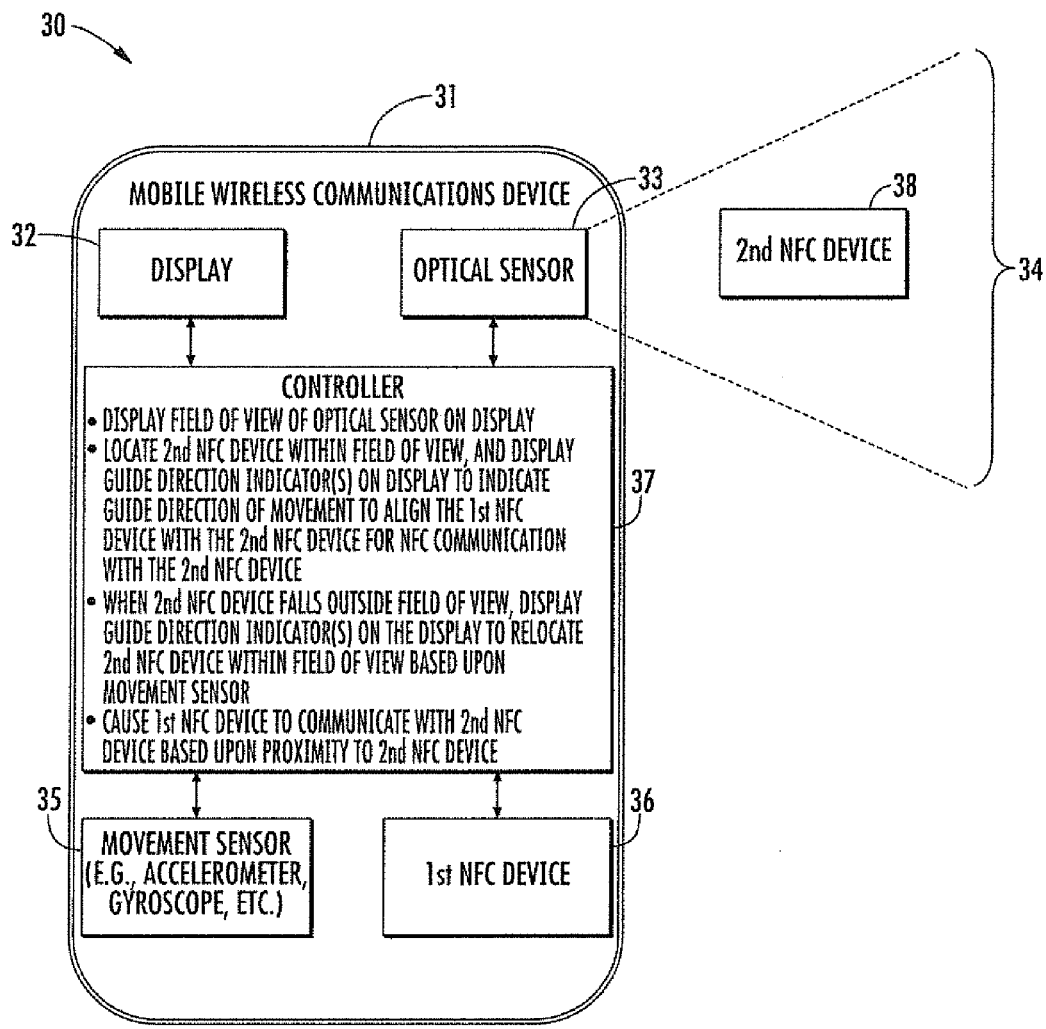
FIG. 1 is a schematic block diagram of a communications system in accordance with one example aspect.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communications system is provided herein which may include a mobile wireless communications device comprising a display, an optical sensor having a field of view, a movement sensor, a first near-field communication (NFC) device, and a controller. The controller may be coupled with the display, the optical sensor, the movement sensor and the first NFC device. The controller may be capable of displaying the field of view of the optical sensor on the display, locating a second NFC device within the field of view, and display at least one indicator on the display to indicate a direction of movement to align the first NFC device with the second NFC device for NFC communication with the second NFC device. When the second NFC device is outside the field of view, the controller may be configured to display the at least one direction indicator on the display to relocate the second NFC device within the field of view based upon the movement sensor. The controller may also cause the first NFC device to communicate with the second NFC device based upon proximity to the second NFC device. As such, guidance may advantageously be provided to move the first NFC device and second NFC into NFC communication range even when the second NFC device falls out of the field of view.

More particularly, the controller may be further capable of displaying a video of the field of view on the display based upon the field of view of the optical sensor, and overlaying the at least one guide direction indicator over the video on the display. In addition, the controller may be further capable of capturing an image of the field of view of the optical sensor, displaying the image of the field of view on the display, and overlaying the at least one direction indicator over the image on the display. Moreover, the controller may be further capable of panning or zooming the image of the field of view on the display.

In one example embodiment, the at least one indicator may comprise a lateral alignment indicator with respect to the second NFC device. In accordance with another example, the at least one indicator may comprise a range indicator with respect to the second NFC device. In some examples, the second NFC device may have viewable dimension indicia thereon, and the controller may determine the range indicator based upon the viewable dimension indicia within the viewable field of the optical sensor. By way of example, the movement sensor may comprise an accelerometer, a gyroscope, etc.

A related communications system including a mobile wireless communications device and second NFC device, such as those described briefly above, is also provided. Moreover, a related method on a mobile wireless communications device, such as the one described briefly above, may include displaying the field of view of the optical sensor on the display, locating a second NFC device within the field of view, and displaying at least one indicator on the display to indicate a direction of movement to align the first NFC device with the second NFC device for NFC communication with the second NFC device. When the second NFC device is outside the field of view, the method may further include displaying the at least one indicator on the display to relocate the second NFC device within the field of view based upon the movement sensor. The method may also include causing the first NFC device to communicate with the second NFC device based upon proximity to the second NFC device.

A non-transitory computer-readable medium for a mobile wireless communications device, such as the one discussed briefly above, is also provided. The non-transitory computer-readable medium may have computer-executable instructions for causing the mobile wireless communications device to perform steps including displaying the field of view of the optical sensor on the display, locating a second NFC device within the field of view, and displaying at least one indicator on the display to indicate a direction of movement to align the first NFC device with the second NFC device for NFC communication with the second NFC device. When the second NFC device is outside the field of view, the at least one indicator may be displayed on the display to relocate the second NFC device within the field of view based upon the movement sensor. Furthermore, the first NFC device may be caused to communicate with the second NFC device based upon proximity to the second NFC device.

Referring initially to FIG. 1, a communications system 30 illustratively includes a mobile wireless communications device 31 (also referred to as a "mobile device" herein). Example mobile devices 31 may include portable or personal media players (e.g., music or MP3 players, video players, etc.), portable gaming devices, portable or mobile telephones, smartphones, tablet computers, digital cameras, etc.

The mobile device 31 further illustratively includes a display 32, an optical sensor 33 having a field of view 34, a movement sensor 35, a first near-field communication (NFC) device 36, and a controller 37 coupled with the display 32, the optical sensor 33, the movement sensor 35 and the first NFC device 36. By way of example, the display 32 may comprise an LCD display, although other suitable display types (e.g., LED, etc.) may also be used. The display 32 may be configured as a touch screen input device in some embodiments, for example. The optical sensor 33 may comprise a charge-coupled device (CCD), for example, such as for a digital camera. Example movement sensors 35 may comprise an accelerometer or gyroscope, or a combination thereof in some embodiments.

By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

The system 30 further illustratively includes a second NFC device 38. By way of example, the second NFC device 38 may be implemented as a passive NFC device or "tag" that is powered by a field generated by the first NFC device 36, which functions as an active NFC device. However, it should be noted that the first NFC device 36 may be passive in some embodiments, and the second NFC device 38 may be an active NFC device in some embodiments.

Referring additionally to FIGS. 2-5, beginning at Block 50, the controller 37 may be configured to display the field of view 34 of the optical sensor 33 on the display 32, at Block 51. By way of example, this may be done responsive to a menu selection by the user (e.g., selecting a digital camera mode, NFC tag location mode, etc.), or via an input device such as a dedicated hot key or other button for launching a camera viewer on the display. Typically, when in a camera mode a video of the field of view 34 is provided on the display 32.

Figure 2:
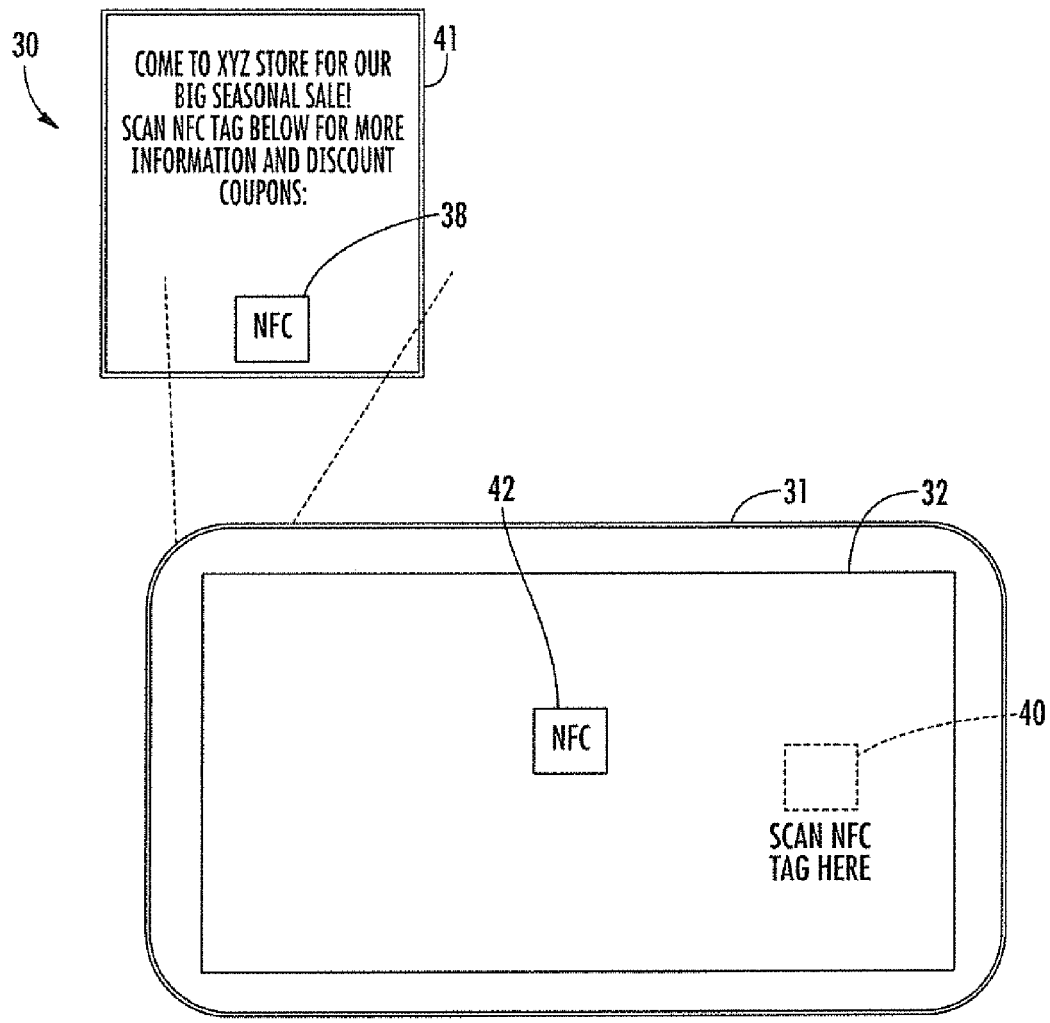
FIG. 2 is a front view of an example implementation of the system of FIG. 1 with a second NFC device within the field of view of a mobile wireless communications device.
Figure 3:
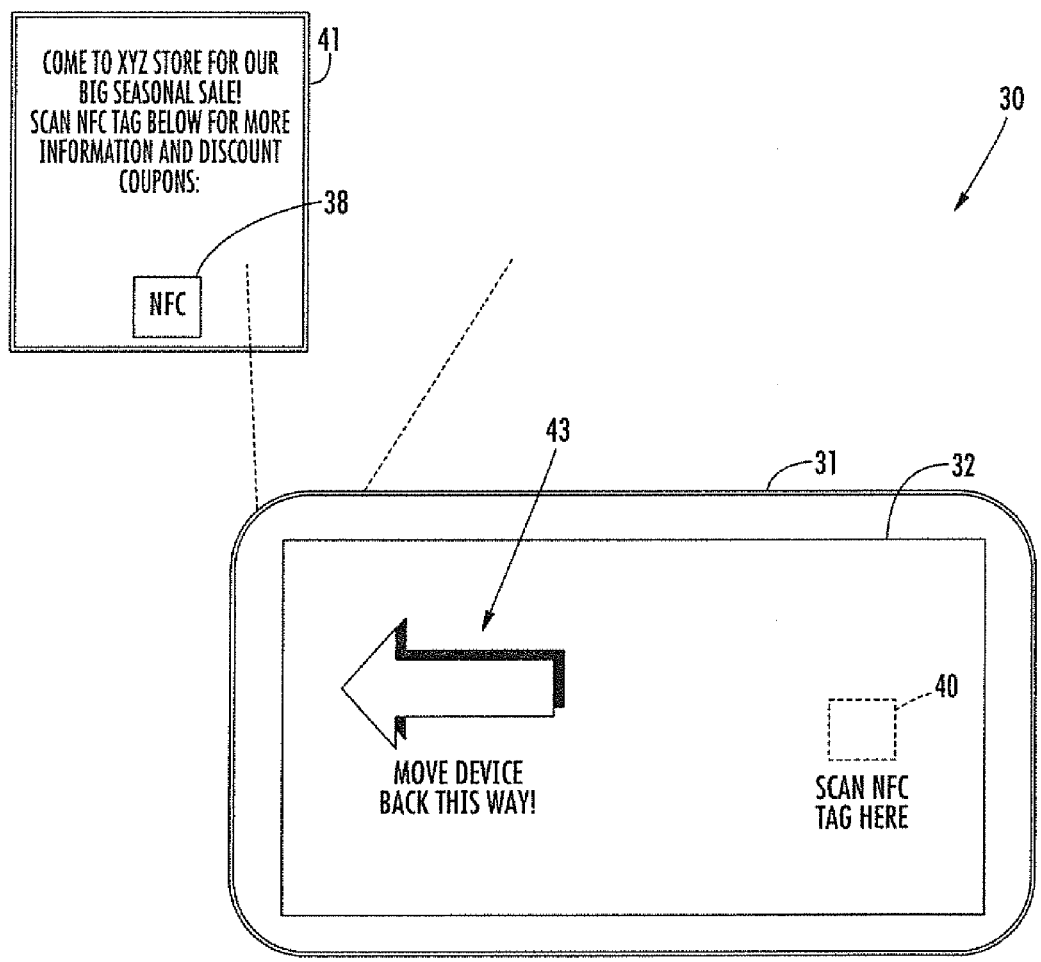
FIG. 3 is a front view of an example implementation of the system of FIG. 2 when the second NFC device falls outside of the field of view of the mobile wireless communications device.
Figure 4:
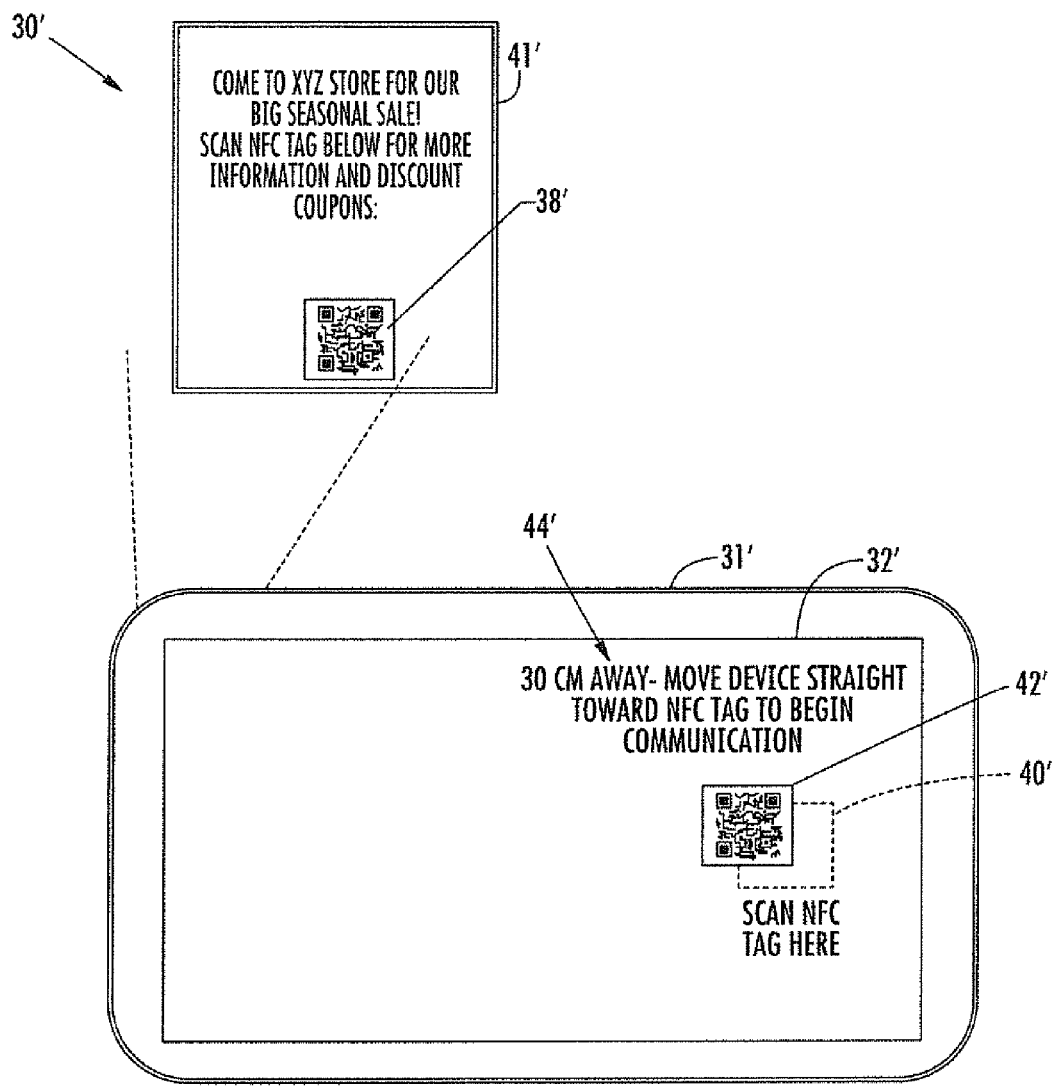
FIG. 4 is a front view of an alternative embodiment of the system of FIG. 2 in which the second NFC device has viewable dimension indicia thereon so that the mobile wireless communications device may determine a range to the second NFC device.

When the optical sensor 33 is directed or pointed at the second NFC device 38, the controller 37 may advantageously locate the second NFC device 38 within the field of view 34, at Block 52. By way of example, this may be done based upon a known shape or configuration of the second NFC device 38, or based upon identifying indicia on the second NFC device 38. In the example of FIGS. 2-3, the second NFC device 38 has as its identifying indicia the abbreviation "NFC", which may be identified through image or character recognition by the controller 37 to identify the second NFC device 38 as an NFC-enabled device with which NFC communication is desired. In the example of FIG. 4, a QR code is associated with the second NFC device 38', which may not only provide an indication that the second NFC device 38' is NFC-enabled (via a QR code reading application, for example), but it may also provide additional information to the controller 37, as will be discussed further below.

As NFC technology becomes more widespread, it is being implemented not only in smartphones and smart cards, but also in larger mobile devices, such as tablet computers. The active region of an NFC antenna tends to be localized to a relatively small region of a given mobile device, particularly with respect to larger mobile devices such as tablet computers. As a result, if the first NFC device 36 is positioned adjacent the back side of the mobile 31 in such an implementation, a user may have difficulty aligning the first NFC device 36 with the second NFC device 38, which may be blocked from the user's field of view by the mobile device (i.e., the second NFC device becomes "hidden" behind the mobile device while the user is looking at the display 32).

The controller 37 may advantageously be configured to display one or more guide direction indicators 40 on the display 32 to indicate a guide direction of movement to align the first NFC device 36 with the second NFC device 38 for NFC communication with the second NFC device 38, at Block 53. In the example of FIG. 2, the second NFC device 38 is located on a sign 41 advertising a sale for XYZ Store. However, the second NFC device 38 need not be positioned on a sign in all embodiments (e.g., it may be co-located with some other type of background or it may stand alone). The direction indicator 40 in this example is a dashed box or rectangle having approximately the same shape as the second NFC device 38 (or as indicia in front of the second NFC device) on the sign 41. However, other indicators besides an outline of the second NFC device 38 may be used in different embodiments (e.g., a bulls eye target, etc.). Moreover, the controller 37 causes the dashed box to appear at a location on the display 32 that coincides with the location of the first NFC device 36 within the mobile device 31 (or on the housing of the mobile device in some embodiments). Thus, as a visual representation 42 of the second NFC device 38 is provided on the display 42 (because it is in the field of view 34 of the optical sensor 33), the controller 37 causes the direction indicator (i.e., the dashed box) to be overlaid or superimposed (i.e., placed in the foreground) on the displayed field of view so that a user is able to tell which way to move the mobile device 31 to align the first NFC device 36 and the second NFC device 38.

Another potential difficulty in guiding the direction of movement of the mobile device 31 so that the first NFC device 36 is aligned with the second NFC device 38 is that in some instances the second NFC device 38 may initially be within the field of view 34 but the mobile device 31 may be moved in such a way that the second NFC device 38 falls outside (i.e., is no longer within) the field of view 34 of the optical sensor 33 (Block 54). In particular, one way in which this may occur is that the mobile device 31 is accidentally moved in a wrong direction so that the first NFC device 36 and the second NFC device 38 are farther away from being aligned with one another. This is the case illustrated in the example of FIG. 3, in which the second NFC device 38 is no longer within the field of view 34 of the optical sensor 33. Here, the controller 37 advantageously displays another guide direction indicator 43 on the display 32 (Block 55) including an arrow indicating the direction back toward the second NFC device 38, and text instructions to "Move device back this way!" (i.e., the way in which the arrow is pointing). That is, the guide direction indicator 43 advantageously helps with relocating the second NFC device 38 within the field of view 34 of the optical sensor 33.

It should be noted that, while both of the guide direction indicators 40 and 43 are used in the illustrated example, in some embodiments a single guide direction indicator (or more than two indicators) may instead be used. For example, the guide direction indicator 40 could instead have been changed from the dashed box to an arrow, and then back to the dashed box once the second NFC device 38 is back within the field of view 34, for example. In any event, the controller 37 may advantageously utilize movement information collected from the movement sensor 35 to provide one or more guide direction indicators to help re-acquire the second NFC device 38 within the field of view 34 of the optical sensor 33. Once re-acquisition has occurred, the guide direction indicator 43 may be removed from the display.

In some embodiments, one type of indicator (e.g. guide direction indicator 43) may be used for indicating coarse movements when the first NFC device 36 and the second NFC device 38 are relatively far from each other and another type of indicator (e.g., guide direction indicator 40) may be used for indicating fine movements when the first NFC device 36 and the second NFC device 38 are relatively near each other.

Another way in which the second NFC device 38 may fall outside the field of view 34 of the optical sensor 33 is when the field of view is not wide enough to "see" the second NFC device as it comes close enough for the first NFC device 38 to begin NFC communication with the second NFC device 38. That is, as noted above, the effective communications range for NFC communications may be on the order of just a few centimeters in certain implementations. However, the optical sensor 33 and the first NFC device 36 may be spaced relatively far apart on some mobile device 31 configurations. For example, the first NFC device 36 may be carried adjacent a bottom of the mobile device 31, while the optical sensor 33 may be adjacent a top of the mobile device 31. For a larger mobile device such as a tablet computer, this separation may be large enough that when the mobile device 31 is moved within a few centimeters of the display 41 with the first NFC device 36 and the second NFC device 38 aligned, the second NFC device 38 will fall outside of the field of view 34. The first NFC device 36 may be physically separated from the optical sensor 33 because the optical sensor 33 may be located on a main circuit board of the mobile device 31, but for interference purposes it is often desirable to isolate the first NFC device 36 and its associated antenna from the main circuit board, for example.

In such case, a video capture of the field of view 34 would no longer show the second NFC device 38, even if it is aligned with the first NFC device 36. Accordingly, the controller 37 may also advantageously be configured to cooperate with the optical sensor 33 to capture a still image of the second NFC device 38 and the surrounding area, which may be displayed on the display 32 instead of a "live" video capture from the optical sensor 33. By way of example, when the optical sensor 33 is first activated to begin image capture, the controller 37 may cause the still image to be taken. Then, when the second NFC sensor 38 is no longer within the field of view 34, the controller 37 may then cause the still image to be displayed on the display 32, and may pan or zoom the still image as appropriate to help guide the first NFC second 36 and the second NFC sensor 38 into alignment, with the assistance of the guide direction indicator 40 or 43. This may advantageously help provide a visual frame of reference as to the location of the second NFC device 38, and whether it is in alignment with the first NFC device 36, i.e., since the second NFC device may still be shown in the still image.

Generally speaking, the better the resolution of the still image captured, the better the features of the still image will look as they are panned or zoomed on the display 32, although various resolutions may be used in different embodiments. Moreover, in some embodiments multiple still images may be captured and stored, such as at different range distances from the second NFC device 38. Thus, an image taken at a relatively close distance with respect to the second NFC device 38 may be used when the second NFC device 38 falls out of the field of view 34 because the mobile device 31 is too close to the second NFC device 38. On the other hand, a still image captured while the mobile device 31 is relatively far away may be used when the second NFC device 38 falls out of the field of view 34 when the mobile device 31 is still not close to the second NFC device 38 (e.g., farther away than 20 cm or so). The controller 37 may be automatically configured to capture the different still images as the mobile device 31 is moved around, although still images could be captured manually based upon an input device (e.g., designated camera or picture button, etc.) in some instances.

In the above-described embodiments, the guide direction indicators 40 and 43 may be considered as lateral alignment indicators in that they are intended to guide a user to move the mobile device 31 left, right, up or down with respect to the second NFC device 28. However, in some implementations the controller 37 may also advantageously be configured to provide a range alignment indicator (i.e., to provide an indication whether the mobile device 31 should be moved closer (i.e., toward) or farther (i.e., away from) the second NFC device 38). In the example of FIG. 4, a QR code is associated with the second NFC device 38', and the QR code may advantageously provide information regarding dimensions of the second NFC device (e.g., it is 2 cm×2 cm, etc.) to the controller 37' via a QR reader application. Upon knowing the dimensions of the second NFC device 38' (or the visual indicia associated with the second NFC device in embodiments where the second NFC device is embedded within or behind the sign 41', etc.), the controller 37' may advantageously determine a range to the second NFC device when in the field of view 34'.

In the illustrated example, the visual representation 42' of the second NFC device 38' is at least partially laterally aligned with the guide direction indicator 40', meaning that the first NFC device 36' and the second NFC device 38' are sufficiently laterally aligned for NFC communication. However, the mobile device 31' is still too far away from the display 41' for the first NFC device 36' and the second NFC device 38' to begin NFC communication (i.e., they are outside of the effective NFC communication range). The controller 37' discerns this range information from the QR code associated with the second NFC device 38', as noted above, and advantageously provides a range indicator 44' to advise the user that the mobile device 31' needs to be moved inward toward the sign 41' (or outwardly away from the sign, if appropriate).

In the present example, the range indicator 44' comprises a text message indicating that the second NFC device 38' is still 30 cm away, and that the mobile device 31' should be moved straight toward the "NFC tag" to begin NFC communication. Other suitable range indicators may also be used, such as a straightforward indication to move the mobile device 31' in or out, or a more detailed indication such as a slider or sliding scale to visually represent how far away the second NFC device 38' is, a countdown indicator that changes as the range changes, etc. Moreover, in some implementations different symbols (e.g., inward or outward pointing arrows, etc.) may be used to indicate which direction the mobile device 31' should be moved for ranging purposes when aligning the first NFC device 36' and the second NFC device 38' for NFC communication.

It should be noted that other approaches besides QR codes may also be used for determining ranging information from the mobile device 31' to the second NFC device 38'. For example, in some implementations multiple optical sensors 33' may be provided, with which the controller 37' may cooperate to determine a range to the second NFC device 38'. In accordance with another example, if the second NFC device 38' is associated with another wireless transmitter (e.g., a WLAN transmitted, etc.), a signal strength from the other transmitter may provide an indication of range. Also, other suitable symbols besides QR codes (e.g., barcodes, etc.) may also be used.

One particular advantage of the range finding implementation described above is that this may advantageously provide for battery power savings. That is, in the case where the first NFC device 36' is an "active" device, it may be turned off or placed in a low power operating mode (e.g., a lower scan rate) until it is determined that the second NFC device 38' is within a designated range (e.g., within 20 cm, etc.) to advantageously reduce power consumption by the first NFC device 36'. The first NFC device 36' may be switched on or to a higher scan rate mode (which consumes more power) once it is determined through range finding that NFC communication is imminent, and may conversely be placed back in the power saving mode once NFC communications have been completed.

Figure 5:
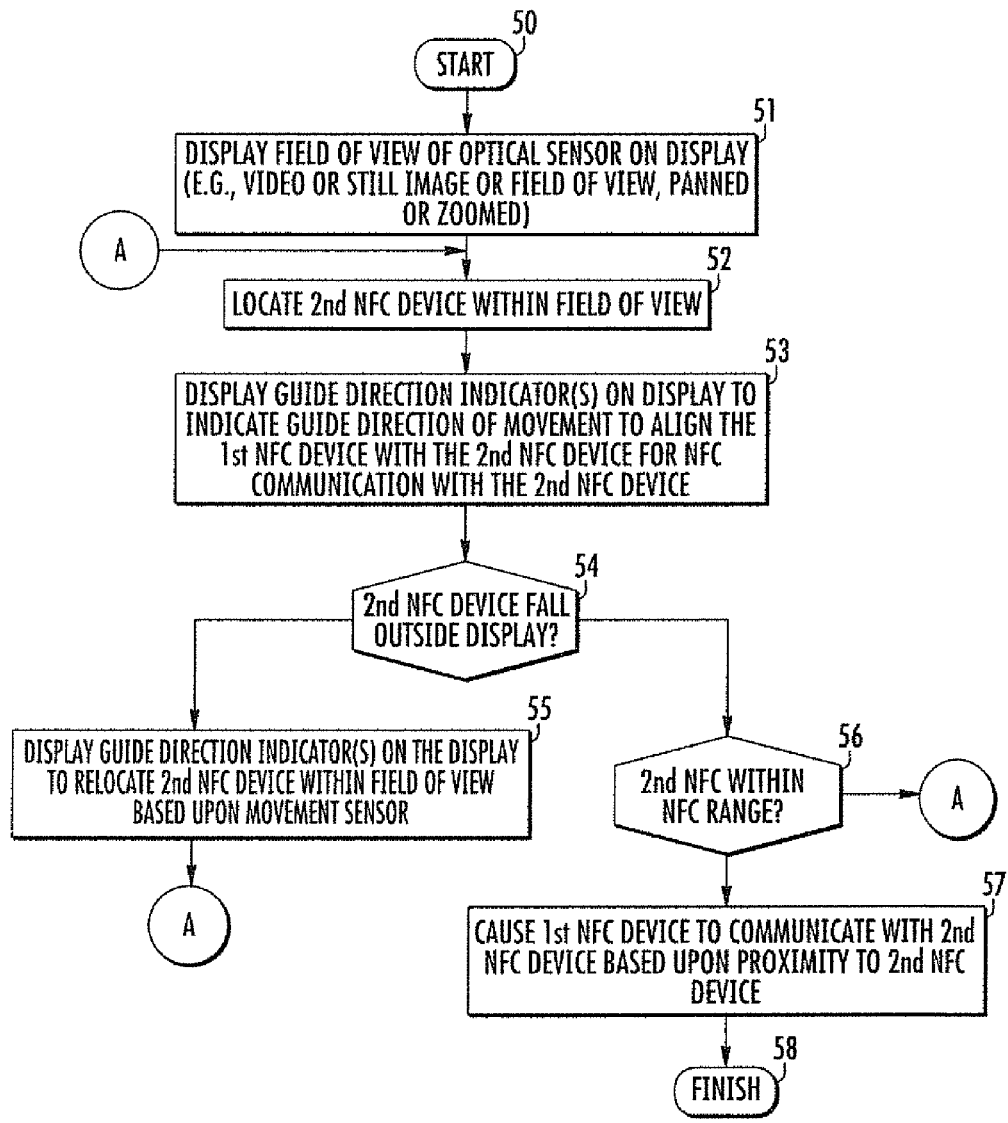
FIG. 5 is a flow diagram illustrating method aspects associated with the embodiments of FIGS. 1-4.

Once the first NFC device 36 and the second NFC device 38 are within range of one another, they will discover one another based upon their proximity and begin NFC communication in accordance with the appropriate NFC protocol being used (e.g., A, B, F, etc.), at Blocks 56-57, which concludes the method illustrated in FIG. 5 (Block 58). However, if the first NFC device 36 and the second NFC device 38 were moved apart before completion of an NFC communication, the above-described process may be automatically initiated again by the controller 37 to once again guide re-alignment so that the communication may be completed, for example.

Example components of a mobile wireless communications device 1000 that may be used in accordance with the above-described embodiments are further described below with reference to FIG. 6. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 6:
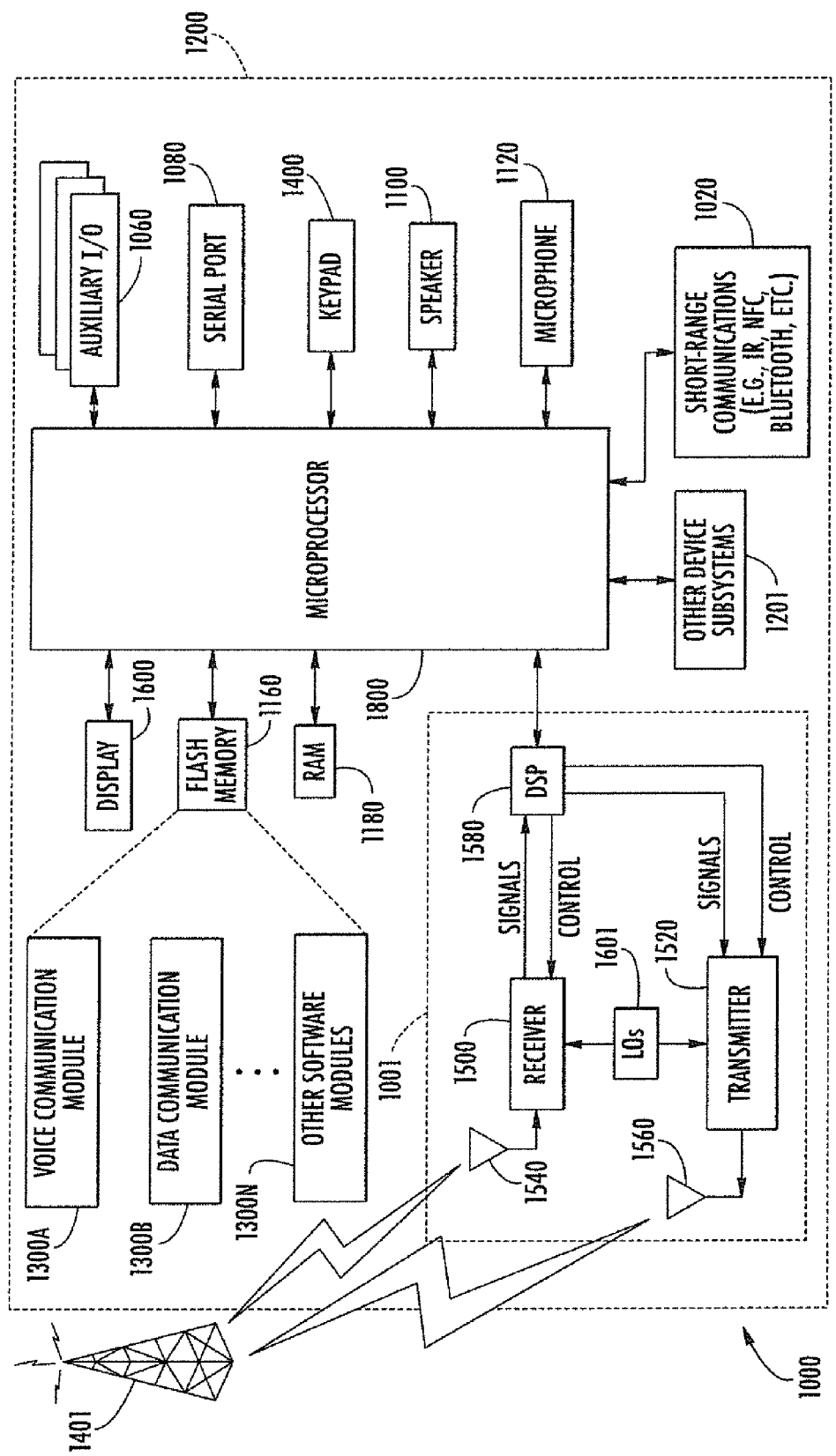
FIG. 6 is a schematic block diagram illustrating example mobile wireless communications device components that may be used with the mobile devices of FIGS. 1-4.

In addition to the processing device 1800, other parts of the mobile device 1000 are shown schematically in FIG. 6. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet. Other example input devices may include optical sensors or movement sensors, such as accelerometers or gyroscopes, for example.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (Los) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000.

The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A mobile wireless communications device comprising:
   a memory that stores executable instructions;
   a display;
   an optical sensor having a lateral field of view;
   a movement sensor;
   a first near-field communication (NFC) device; and
   a controller coupled with the display, the optical sensor, the movement sensor and the first NFC device, wherein the controller, responsive to executing the executable instructions, facilitates performance of operations comprising:
      displaying a video of the lateral field of view of the optical sensor on the display;
      locating and identifying a second NFC device within the video of the lateral field of view, capturing a still image of the second NFC device, and displaying a range indicator on the display to indicate a range distance to the second NFC device to initiate NFC communication with the second NFC device, wherein the identifying of the second NFC device is based on detecting, via image recognition, an identification indicator on the second NFC device;
      responsive to the second NFC device being outside the lateral field of view, displaying the still image of the second NFC device on the display, determining a lateral alignment indicator based upon the movement sensor and displaying the lateral alignment indicator on the display to facilitate relocation of the second NFC device to a position within the lateral field of view;
      responsive to the second NFC device being inside the lateral field of view, displaying the video of the lateral field of view on the display, ceasing the displaying of the lateral alignment indicator on the display and displaying a scanning indicator on the display to relocate the second NFC device aligned with the scanning indicator based upon the movement sensor; and
      causing the first NFC device to communicate with the second NFC device based upon proximity to and alignment with the identification indicator of the second NFC device.

2. The mobile wireless communications device of claim 1 wherein the controller is further capable of overlaying the range indicator and the lateral alignment indicator over the video of the lateral field of view on the display, responsive to the second NFC device being inside the lateral field of view.

3. The mobile wireless communications device of claim 1 wherein the controller is further capable of displaying the still image of the lateral field of view on the display, and overlaying the range indicator and the lateral alignment indicator over the still image of the second NFC device on the display, responsive to the second NFC device being outside the lateral field of view.

4. The mobile wireless communications device of claim 3 wherein the controller is further capable of panning the still image of the lateral field of view on the display, based on a relative movement of the mobile wireless communications device and the second NFC device.

5. The mobile wireless communications device of claim 3 wherein the controller is further capable of zooming the still image of the second NFC device on the display.

6. The mobile wireless communications device of claim 4 wherein the second NFC device has viewable dimension indicia thereon; and wherein the controller generates the range indicator based upon the viewable dimension indicia within the lateral field of view of the optical sensor, wherein the scanning indicator is presented utilizing broken lines.

7. The mobile wireless communications device of claim 1 wherein the movement sensor comprises an accelerometer, and wherein the identification indicator comprises readable dimension data that is read by the controller to determine dimensions of the second NFC device.

8. The mobile wireless communications device of claim 1 wherein the movement sensor comprises a gyroscope, and wherein the identification indicator comprises readable dimension data that is read by the controller to determine dimensions of the second NFC device.

9. A communications system comprising:
a mobile wireless communications device comprising:
  a display;
  an optical sensor having a lateral field of view;
  a movement sensor;
  a first near-field communication (NFC) device; and
  a controller coupled with the display, the optical sensor, the movement sensor and the first NFC device; and
a second NFC device,
wherein the controller of the mobile wireless communications device facilitates performance of operations comprising:
  displaying a video of the lateral field of view of the optical sensor on the display;
  locating and identifying the second NFC device within the lateral field of view, obtaining a still image of the second NFC device, and displaying a range indicator on the display to indicate a range distance to the second NFC device to initiate NFC communication with the second NFC device, wherein the second NFC device is identified based on detecting via image recognition an identification indicator on the second NFC device;
  responsive to the second NFC device being outside the lateral field of view displaying the still image of the second NFC device on the display, determining a lateral alignment indicator based upon the movement sensor and displaying the lateral alignment indicator on the display to facilitate relocation of the second NFC device to a position within the lateral field of view;
  responsive to the second NFC device being inside the lateral field of view, displaying the video of the lateral field of view of the optical sensor on the display, ceasing the displaying of the lateral alignment indicator on the display and displaying a scanning indicator on the display to relocate the second NFC device aligned with the scanning indicator based upon the movement sensor; and
  causing the first NFC device to communicate with the second NFC device based upon proximity to and alignment with the identification indicator of the second NFC device.

10. The system of claim 9 wherein the operations further comprise overlaying the range indicator and lateral alignment indicator over the video on the display, responsive to the second NFC device being inside the lateral field of view of the optical sensor.

11. The system of claim 9 wherein the operations further comprise displaying the still image of the lateral field of view on the display, and overlaying the range indicator and the lateral alignment indicator over the still image of the second NFC device on the display, responsive to the second NFC device being outside the lateral field of view of the optical sensor.

12. The system of claim 11 wherein the operations further comprise at least one of panning the still image of the lateral field of view on the display or zooming the still image of the second NFC device on the display.

13. A method on a mobile wireless communications device comprising a display, an optical sensor having a lateral field of view, a movement sensor, a processing system including a processor, and a first near-field communication (NFC) device, the method comprising:
  displaying a video of the lateral field of view of the optical sensor on the display;
  locating and identifying a second NFC device within the video of the lateral field of view, capturing a still image of the second NFC device, and displaying a range indicator on the display to indicate a range distance to the second NFC device to initiate NFC communication with the second NFC device, wherein the identifying of the second NFC device is based on detecting via image recognition at least one of an identification indicator on the second NFC device or a shape of the second NFC device;
  responsive to the second NFC device being outside the lateral field of view, displaying the still image of the second NFC device, determining a lateral alignment indicator based upon the movement sensor and displaying the lateral alignment indicator on the display to facilitate relocation of the second NFC device to a position within the lateral field of view;
  responsive to the second NFC device being inside the lateral field of view, displaying the video of the lateral field of view, ceasing the displaying of the lateral alignment indicator on the display and displaying a scanning indicator on the display to relocate the second NFC device aligned with the scanning indicator based upon the movement sensor; and
  causing the first NFC device to communicate with the second NFC device based upon proximity to and alignment with the identification indicator of the second NFC device.

14. The method of claim 13 wherein displaying of the video of the lateral field of view further comprises overlaying the range indicator and the lateral alignment indicator are overlayed over the video of the lateral field of view on the display, responsive to the second NFC device being inside the lateral field of view.

15. The method of claim 13 wherein the range indicator and the lateral alignment indicator are overlayed over the still image of the second NFC device on the display, responsive to the second NFC device being outside the lateral field of view.

16. The method of claim 15 further comprising at least one of panning or zooming the still image of the second NFC device on the display.

17. A non-transitory computer readable medium for a mobile wireless communications device comprising a display, an optical sensor having a lateral field of view, a movement sensor, a processing system including a processor and a first near-field communication (NFC) device, the non-transitory computer readable medium having machine-executable instructions that when executed by the processing system facilitate performance of operations comprising:

displaying a video of the lateral field of view of the optical sensor on the display;

locating and identifying a second NFC device within the lateral field of view, obtaining a still image of the second NFC device within the lateral field of view, and displaying a range indicator on the display to indicate range distance to the second NFC device to initiate NFC communication with the second NFC device, wherein the identifying of the second NFC device is based on detecting via image recognition at least one of an identification indicator on the second NFC device or a shape of the second NFC device;

when the second NFC device is outside the lateral field of view, displaying the still image of the second NFC device on the display, determining a lateral alignment indicator based upon the movement sensor and displaying the lateral alignment indicator on the display to facilitate relocation of the second NFC device to a position within the lateral field of view;

responsive to the second NFC device being inside the lateral field of view, displaying the video of the lateral field of view on the display, ceasing the displaying of the lateral alignment indicator on the display and displaying a scanning indicator on the display to relocate the second NFC device aligned with the scanning indicator based upon the movement sensor; and causing the first NFC device to communicate with the second NFC device based upon proximity to and alignment with the identification indicator of the second NFC device.

18. The non-transitory computer readable medium of claim 17 wherein displaying of the video of the lateral field of view, responsive to the second NFC device being inside the lateral field of view further comprises overlaying the range indicator and the lateral alignment indicator over the video of the lateral field of view on the display.

19. The non-transitory computer readable medium of claim 17 wherein the displaying of the still image of the second NFC device on the display further comprises overlaying the range indicator and the lateral alignment indicator over the still image of the second NFC device on the display.

20. The non-transitory computer readable medium of claim 19 wherein the operations further comprise at least one of panning or zooming the still image of the second NFC device on the display.

21. The mobile wireless communications device of claim 1, wherein an operating power of the first NFC device is based on a range distance to the second NFC device.

22. The system of claim 9, wherein an operating power of the first NFC device is based on a range distance to the second NFC device.

23. The method of claim 13, wherein an operating power of the first NFC device is based on a range distance to the second NFC device.

24. The non-transitory computer readable medium of claim 17, wherein an operating power of the first NFC device is based on a range distance to the second NFC device.

* * * * *